United States Patent [19]

Provenzano

[11] Patent Number: 4,858,427
[45] Date of Patent: Aug. 22, 1989

[54] SECONDARY OIL SYSTEM FOR GAS TURBINE ENGINE

[75] Inventor: Nicholas J. Provenzano, Indianapolis, Ind.

[73] Assignee: General Motors Corporation, Detroit, Mich.

[21] Appl. No.: 229,401

[22] Filed: Aug. 8, 1988

[51] Int. Cl.[4] .............................................. F02C 7/06
[52] U.S. Cl. .................................. 60/39.08; 184/6.11; 184/6.4; 384/465; 384/473
[58] Field of Search ............... 60/39.08, 39.091, 39.83; 184/6.4, 6.11; 384/473, 465

[56] References Cited

U.S. PATENT DOCUMENTS

| | | | |
|---|---|---|---|
| 2,911,267 | 11/1959 | Small, Jr. | |
| 3,111,195 | 11/1963 | Wilkinson | 184/6 |
| 3,589,471 | 6/1971 | Edge | 184/6 |
| 3,621,937 | 11/1971 | Edge | 60/39.08 |
| 3,779,345 | 12/1973 | Barnes et al. | 60/39.08 |
| 3,857,462 | 12/1974 | Kaufman et al. | 184/11 |
| 4,153,141 | 5/1979 | Methlie | 60/39.08 |
| 4,271,928 | 6/1981 | Northern | 60/39.08 |
| 4,284,174 | 8/1981 | Salvana et al. | 184/6.4 |
| 4,373,421 | 2/1983 | Camboulives et al. | 60/39.08 |
| 4,390,082 | 6/1983 | Swearingen | 60/39.08 |
| 4,511,016 | 4/1985 | Döell | 60/39.08 |
| 4,564,084 | 1/1986 | Heckel | 60/39.08 |
| 4,683,714 | 8/1987 | Thebert | 60/39.08 |

Primary Examiner—Donald E. Stout
Attorney, Agent, or Firm—Saul Schwartz

[57] ABSTRACT

A secondary oil system for a flight propulsion gas turbine engine includes an oil reservoir rotatable as a unit with a rotor shaft of the engine, means conducting a portion of the primary oil flow of the engine to the rotating reservoir, a discharge orifice on the reservoir limiting centrifugal force induced oil discharge from the reservoir to a secondary oil flow rate substantially less than the primary oil flow rate to a bearing supporting the rotor on a case of the engine, and means for conducting the secondary oil flow to the bearing. The secondary oil flow persists for on the order of ten minutes after primary oil flow stops.

3 Claims, 1 Drawing Sheet

SECONDARY OIL SYSTEM FOR GAS TURBINE ENGINE

FIELD OF THE INVENTION

This invention relates to a secondary oil system in a flight propulsion gas turbine engine for lubricating elements of the engine after primary lubrication stops.

BACKGROUND OF THE INVENTION

In the primary oil systems of flight propulsion gas turbine engines, centrifugal force is often employed to induce primary oil flow to rotor shaft bearings. For example, oil may be sprayed from a stationary nozzle onto a tapering inside wall of the rotating shaft. Centrifugal force holds the oil on the surface and induces the oil to flow in a direction determined by the taper of the wall to an orifice through the wall. The oil migrates radially out through the orifice to a bearing. In one such system having two parallel flow paths, one of the flow paths is inactive except when the other flow path is blocked. In such systems, generally, if primary oil flow stops, residual oil in the primary system may maintain only momentary lubrication.

To the end of sustaining lubrication after primary oil flow stops, secondary oil systems have been proposed wherein a secondary flow of oil from a stationary reservoir on the engine is directed to the bearing. In such systems, gravity, air pressure or ejector generated suction induces the secondary oil flow. A new and improved secondary oil system according to this invention incorporates a reservoir for the secondary oil which rotates with the rotor shaft whereby centrifugal force induces secondary oil flow.

SUMMARY OF THE INVENTION

This invention is a new and improved secondary oil system for a gas turbine engine and particularly suited for a flight propulsion gas turbine engine wherein a secondary oil reservoir is disposed on and rotates with the rotor shaft of the engine. In the secondary oil system according to this invention, the reservoir is in a secondary oil flow path which is parallel to and supplied by the primary oil flow path. The rotating reservoir has an orifice which limits centrifugal force induced secondary oil flow to a small fraction of the primary oil flow rate yet consistent with limited bearing durability. Under normal conditions, the secondary oil flow represents a relatively insignificant supplement to primary oil flow to the bearing. When primary oil flow stops, the centrifugal force induced secondary oil flow persists until the oil supply in the rotating reservoir is exhausted, the duration of secondary oil flow exceeding the duration of residual oil lubrication and permitting controlled descent of the aircraft. In one embodiment of the secondary oil system according to this invention, the rotating reservoir is an annular tank on the rotor shaft which receives oil from the primary oil system through a groove in the shaft and discharges oil through an orifice in the side of the tank. In another embodiment, the reservoir is a rotating pool of oil on an inside wall of a sleeve on the rotor shaft and the secondary oil flow is controlled by an orifice in the wall of the sleeve submerged in the rotating pool of oil.

DESCRIPTION OF PREFERRED EMBODIMENTS

Figure 1:
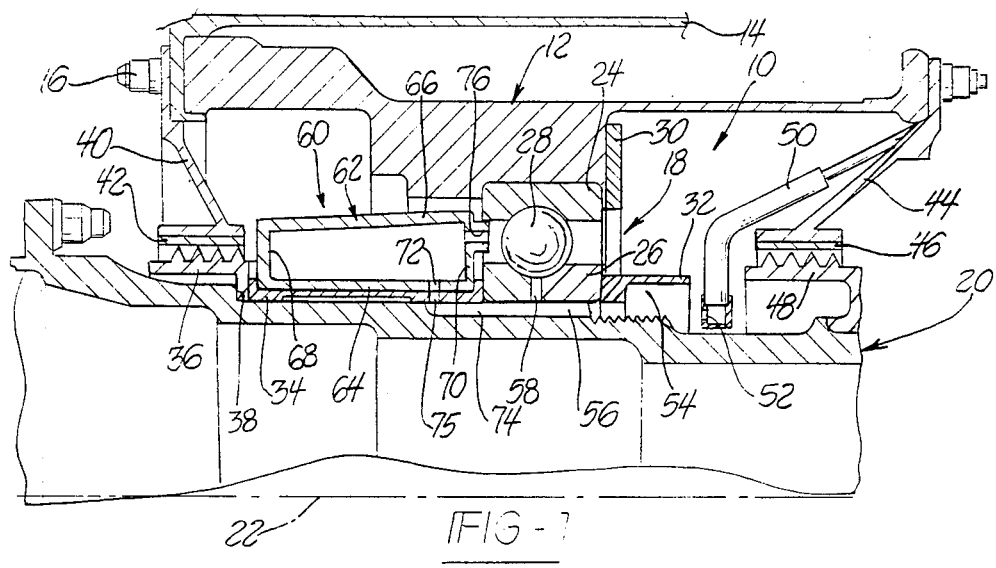
FIG. 1 is an elevational view of a portion of a gas turbine engine having a secondary oil system according to this invention and illustrating a first embodiment of the system in an intermediate bearing sump of the engine.

Referring to FIG. 1, an intermediate bearing sump 10 of a fragmentarily illustrated flight propulsion gas turbine engine is located radially inboard of a generally annular sump housing 12. The sump housing 12 is a rigid internal appendage of the casing, not shown, of the engine and may be attached to the casing through a rigid internal annular web 14 and an array of bolts 16. A bearing 18 is disposed between the housing 12 and a tubular rotor shaft 20 of the engine at an intermediate location between the ends of the shaft. The bearing 18 cooperates with other bearings in supporting the rotor shaft on the engine casing for rotation about a main rotor axis 22 of the engine.

The bearing 18 has an outer race 24 disposed on the housing 12, an inner race 26 on the rotor shaft 20, and a plurality of bearing balls 28 between the races. The outer race is retained on the housing by a retainer plate 30. The inner race is retained on the rotor shaft 20 by a nut 32 threaded on the shaft which captures the inner race 26, a spacer 34, and a seal runner 36 against a shoulder 38 of the shaft.

To the left of the bearing, FIG. 1, the sump 10 is closed by an annular partition 40 attached to the web 14. The partition 40 carries a representative labyrinth seal 42 which cooperates with the seal runner 36 in defining a seal at one side of the sump 10. To the right of the bearing, FIG. 1, the sump 10 is closed by an annular partition 44 attached to the sump housing 12. The partition 44 carries a representative labyrinth seal 46 which cooperates with a seal runner 48 on the rotor shaft 20 in defining a seal at the opposite side of the sump 10.

The primary oil system of the engine includes a pipe 50 rigidly affixed to the sump housing 12 nd communicating with a primary oil passage therein, not shown. The pipe 50 has a jet orifice 52 at the end thereof adjacent the nut 32. When the engine operates normally, the pipe 50 is filled with oil under pressure and the orifice 52 directs a jet of oil into an annular chamber 54 defined between the nut 32 and the outside diameter of the shaft 20.

The primary oil system further includes a groove 56 in the outside diameter of the shaft 20 which extends from the chamber 54 to a radial orifice 58 in the inner race 26 of the bearing 18. When the shaft 20 is rotating at speeds up to a normal or rated speed, oil captured in the chamber 54 is induced by centrifugal force to flow at a primary oil flow rate through the groove 56 and through the orifice 58 to effect primary lubrication of the bearing 18. The oil is maintained within the sump 10 by the aforesaid seals at the opposite sides thereof and is returned to the primary oil system by any conventional scavenge arrangement, not shown. A secondary oil system 60 according to this invention operates concurrently and in parallel with the primary oil system and persists in operation for a secondary duration after primary oil flow stops.

The secondary oil system 60 includes an at least partly annular reservoir tank 62 around the rotor shaft in the sump 10 and adjacent the bearing 18. The tank 62 is rigidly attached to the rotor shaft 20 and rotates as a unit therewith about the axis 22. The tank 62 has an inner wall 64, an outer wall 66, and a pair of end walls 68 and 70. The inner wall 64 is generally cylindrical and closely received over the outside diameter of the rotor shaft. The outer wall 66 flares radially outward from a minimum radial dimension at the end wall 68 to a maximum radial dimension at the end wall 70.

The inner wall 64 has an inlet orifice 72 therein registering with a groove 74 in the outside diameter of the rotor shaft 20 which groove represents a branch of the primary oil groove 56. The orifice 72 likewise registers with a hole 75 in the spacer 34. The end wall 70 of the reservoir has a flanged discharge orifice 76 therein adapted to aim an oil jet at the bearing balls 28.

The secondary oil system 60 operates in conjunction with the primary oil system of the engine as follows. In flight, the rotor shaft rotates at or near rated speed and the oil jet issuing from the jet orifice 52 on the pipe 50 keeps the chamber 54 within the nut 32 filled with oil. Centrifugal force induces a primary oil flow from the chamber 54 through the groove 56 and the orifice 58 to the bearing 18 for primary lubrication.

Concurrently, part of the primary oil flow is conducted by the groove 74 to the hole 75 and the inlet orifice 72 and into the reservoir tank 62. The flow rate into the tank effects relatively rapidly fill of the tank upon engine start-up. Centrifugal force on the oil in the tank 62 induces a jet of oil to issue at a secondary flow rate from flanged discharge orifice 76 and to impinge on the bearing balls 28. The secondary oil flow supplements the aforesaid primary oil flow.

If primary oil flow stops while the rotor shaft rotates at or near rated speed, the residual oil in the primary oil system may effect momentary continued lubrication of the bearing 18. Centrifugal force, however, continues to induce the aforesaid secondary oil flow onto the bearing from the tank 62. The flow area of the discharge orifice 76 is calculated or predetermined to maximize the duration of secondary oil flow consistent with the objective of limited bearing durability. The secondary oil flow rate is, therefore, only a small fraction of the primary oil flow rate and just enough to maintain an oil film between the races and the bearing balls of the bearing 18 for a secondary duration of on the order of about ten minutes after primary oil flow stops. Being only a small fraction of the primary oil flow, the supplementary effect of the secondary oil flow on the primary oil flow during normal engine operation is minimal.

Figure 2:
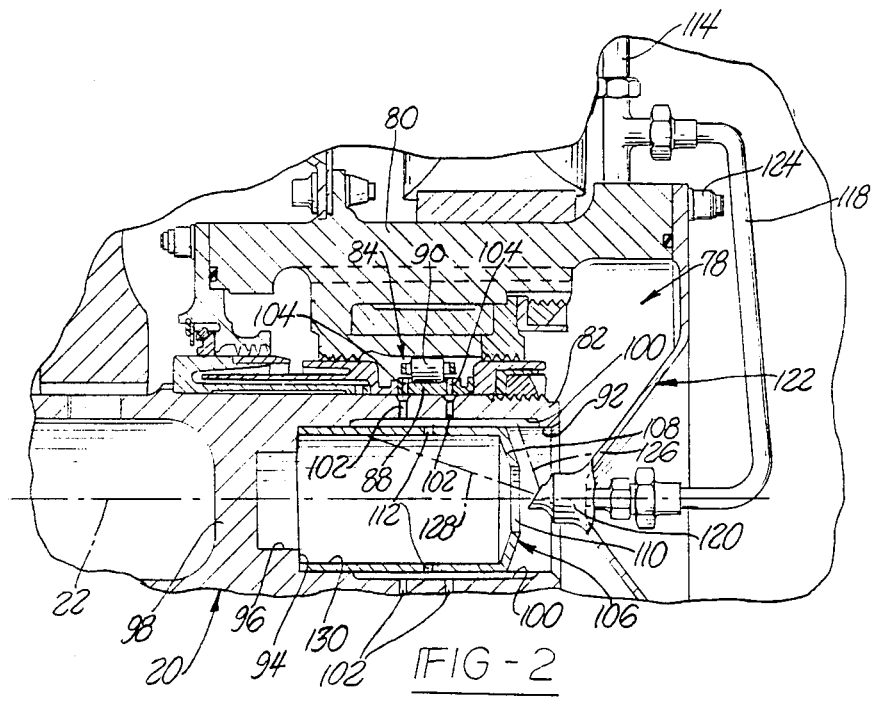
FIG. 2 is an elevational view of another portion of the gas turbine engine having a secondary oil system according to this invention and illustrating a second embodiment of the system in an end bearing sump of the engine.

Referring to FIG. 2, an end bearing sump 78 of the gas turbine engine is defined radially inboard of a rigid annular sump housing 80 and radially outboard of a tubular end 82 of the rotor shaft 20. The tubular end 82 of the rotor shaft is supported on the sump housing 80 for rotation about the main rotor axis 22 by a roller bearing 84 which includes an inner race 88 attached to the rotor shaft 20 and a plurality of rollers 90.

The tubular end 82 of the rotor shaft has a cylindrical inside wall 92 extending from generally the right extremity of the shaft to an annular shoulder 94. The shoulder 94 defines a step between the inside wall 92 and a smaller diameter inside wall 96 which extends from the step to a solid web 98 of the shaft. A plurality of axially extending oil grooves 100 on the inside wall 92 extend from near the right extremity of the rotor shaft toward the shoulder 94. Each of the grooves 100 registers with a pair of radial passages 102 through the rotor shaft which, in turn, register with a corresponding pair of radial passages 104 in the inner race 88 of the roller bearing 84.

A generally cylindrical sleeve 106, rotatable as a unit with the rotor shaft 20, is closely received in the inside cylindrical wall 92 and abuts the shoulder 94. The left end of the sleeve facing the web 98 is open. The right end of the sleeve is partly closed by an inturned flange 108 which defines a window 110 into the inside of the sleeve centered on the axis 22. The sleeve 106 is pierced by a plurality of discharge orifices 112 each registering with a corresponding one of the grooves 100 in the inside wall 92 of the rotor shaft. The sleeve 106 is shorter in length than the grooves 100 so that with the sleeve abutting the shoulder 94 the right extremity of each groove 100 is exposed and accessible from outside of the sleeve.

A pipe 114 of the primary oil system of the engine is connected to the sump housing 80. A second pipe 118 branches from the pipe 114 and terminates at a nozzle 120 formed integrally on an end plate 122. The end plate is rigidly attached to the sump housing 80 by an array of bolts 124.

The nozzle 120 has a primary orifice, not shown, and a secondary orifice, also not shown, each exposed to oil under pressure in the pipe 118 of the primary oil system. The primary orifice is located to direct a jet of oil, represented by a broken line 126, at the exposed right ends of the grooves 100 to the right of the sleeve 106. The secondary orifice is located to direct a jet of oil, represented by a broken line 128, through the window 110 and onto an inside surface 130 of the sleeve 106. The primary nozzle orifice, the grooves 100, and the passages 102 and 104 constitute part of the primary oil system of the engine. The secondary orifice in the nozzle 120, the sleeve 106, and the discharge orifices 112 constitute a secondary oil system according to this invention.

The secondary oil system operates in conjunction with the primary oil system as follows. In flight, the rotor shaft rotates at or near rated speed and the primary oil jet represented by broken line 126 issuing from the nozzle 120 creates a centrifugally adhering, rotating, annular pool of oil on the inside wall 92 of the rotor shaft. Centrifugal force induces the oil to flow through the grooves 100 and the radial passages 102 and 104 to the roller bearing 84.

Concurrently, the secondary oil jet represented by broken line 128 impinges on and centrifugally adheres to the inside surface 130 of the sleeve 106 as a rotating annular pool or reservoir. The discharge orifices 112 are submerged in the rotating pool, the radial depth of which is limited by the window 110. Centrifugal force induces a secondary oil flow from the rotating pool through the discharge orifices 112 and into the grooves 100 of the primary oil system. The secondary oil flow supplements the primary oil flow to the bearing 84.

If primary oil flow stops while the rotor shaft rotates at or near rated speed, residual oil in the primary oil system may only momentarily lubricate the roller bearing 84. Centrifugal force on the oil in the rotating pool on the inside surface 130 of the sleeve 106 induces secondary oil flow from the discharge orifices 112 into the grooves 100 at a secondary flow rate determined by the flow area of the discharge orifices 112. The oil from the discharge orifices flows through the passages 102 and 104 and issues onto the rollers 90 for secondary lubrication. The aforesaid flow area of the discharge orifices 112 is calculated or predetermined to maximize the duration of secondary oil flow consistent with the objective of limited bearing durability. The secondary oil flow rate is, therefore, only a small fraction of the primary oil flow rate and just enough to maintain an oil film between the rollers and races of the roller bearing 84 for on the order of about ten minutes after primary oil flow stops. Being only a small fraction of the primary oil flow, the supplementary effect of the secondary oil flow on the primary oil flow during normal engine operation is minimal.

The embodiments of the invention in which an exclusive property or privilege is claimed are defined as follows:

1. In a gas turbine engine having
   a rotor shaft supported on a case of said engine by a bearing for rotation about an axis of said engine, and
   a primary oil system directing a primary oil flow to said bearing at a primary oil flow rate,
   a secondary oil system comprising: an oil reservoir rotatable as a unit with said rotor shaft about said axis,
   means on said engine connected to said primary oil system operative to conduct a portion of said primary oil flow to said reservoir concurrently with said primary oil flow to said bearing,
   discharge orifice means on said reservoir having a predetermined flow area limiting centrifugal force induced discharge of oil from said reservoir to a secondary oil flow rate substantially less than said primary oil flow rate to said bearing so that said centrifugal force induced oil discharge from said reservoir persists for a predetermined duration after said primary oil flow to said bearing stops, and
   means on said engine for directing said centrifugal force induced oil discharge from said reservoir to said bearing.

2. In a gas turbine engine having
   a rotor shaft supported on a case of said engine by a bearing for rotation about an axis of said engine, and
   a primary oil system directing a primary oil flow to said bearing at a primary oil flow rate,
   a secondary oil system comprising: an annular reservoir tank attached to said rotor shaft adjacent said bearing and rotatable as a unit with said rotor shaft about said axis,
   means defining an inlet orifice in said annular reservoir tank,
   means defining an oil groove in said rotor shaft communicating with said inlet orifice in said annular reservoir and with said primary oil system so that said oil groove conducts a portion of said primary oil flow to said reservoir,
   means defining a discharge orifice in a wall of said annular reservoir tank adjacent said bearing having a predetermined flow area limiting centrifugal force induced discharge of oil from said annular reservoir tank to a secondary oil flow rate substantially less than said primary oil flow rate to said bearing so that said centrifugal force induced oil discharge from said annular reservoir tank persists for a predetermined duration after said primary oil flow to said bearing stops, and
   a flange on said wall of said annular reservoir tank operative to confine said centrifugal force induced discharge of oil from said annular reservoir tank to a jet of oil impinging on said bearing at said secondary oil flow rate.

3. In a gas turbine engine having
   a rotor shaft supported on a case of said engine by a bearing for rotation about an axis of said engine, and
   a primary oil system directing a primary oil flow to said bearing at a primary oil flow rate and including a primary distribution groove in an inside cylindrical wall of said rotor shaft and a stationary nozzle directing a jet of oil at substantially said primary oil flow rate into said primary distribution groove wherefrom said oil is conducted to said bearing,
   a secondary oil system comprising:
   a sleeve on said rotor shaft rotatable as a unit therewith about said axis and having a cylindrical wall juxtaposed said inside cylindrical wall of said rotor shaft and readily inboard of said primary distribution groove,
   a stationary nozzle on said engine connected to said primary oil system and directing a portion of said primary oil flow as a jet of oil at a radially inboard surface of said cylindrical wall of said sleeve and forming a rotating pool of oil on said radially inboard surface retained thereon by centrifugal force, means on said rotor shaft at opposite ends of said radially inboard surface of said cylindrical wall of said sleeve operative to capture said rotating pool of oil therebetween so that said rotating pool defines an oil reservoir on said rotor shaft rotatable as a unit therewith about said axis, and
   means defining a discharge orifice in said cylindrical wall of said sleeve submerged in said rotating pool of oil and registering with said primary distribution groove,
   said discharge orifice having a predetermined flow area limiting centrifugal force induced discharge of oil from said rotating pool of oil and into said primary distribution groove to a secondary oil flow rate substantially less than said primary oil flow rate to said bearing so that said centrifugal force induced oil discharge from said rotating pool of oil persists for a predetermined duration after said primary oil flow to said bearing stops.

* * * * *